C. HEIN.

Assignor to HALE & MULFORD.

Bracelet.

No. 8,928. Reissued Oct. 14, 1879.

Witnesses:
Geo. C. Kenon
W. H. Hollingsworth

Inventor:
C. Hein
By Munn & Co.
Attorney.

N. PETERS, PHOTO-LITHOGRAPHER, WASHINGTON, D. C.

UNITED STATES PATENT OFFICE.

CHARLES HEIN, OF CORONA, NEW YORK, ASSIGNOR TO HALE & MULFORD, OF NEW YORK, N. Y.

IMPROVEMENT IN BRACELETS.

Specification forming part of Letters Patent No. 212,692, dated February 25, 1879; Reissue No. 8,928, dated October 14, 1879; application filed July 29, 1879.

*To all whom it may concern:*

Be it known that I, CHARLES HEIN, of Corona, in the county of Queens and State of New York, have invented a new and useful Improvement in Bracelets; and I do hereby declare that the following is a full, clear, and exact description of the same, reference being had to the accompanying drawings, forming part of this specification, in which—

Figure 1:
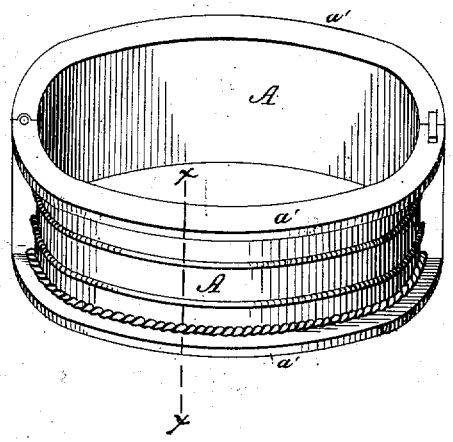
Figure 2:
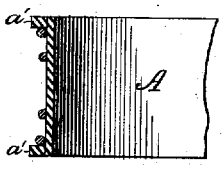

Figure 1 is a perspective view of a bracelet illustrating my invention. Fig. 2 is a detail section of the same, taken through the line *x x*, Fig. 1.

The object of this invention is to furnish bracelets which shall be so constructed as to protect the raised ornamental work formed upon or attached to them from being rubbed, pulled, or knocked off, while at the same time displaying the ornaments to advantage, and forming neat and beautiful articles of jewelry.

The invention consists of a band-bracelet made of a single thickness of metal, with raised ornamentation upon its outer periphery, and with projecting or flanged edges, which rise to the level of or above the raised ornamental work, so as to protect the latter against abrasion and wear, as hereinafter more fully described.

In practice the bracelet is formed of two half-ring bands, A, hinged to each other at one end, and connected by a catch at their other ends. The band A is made of a single thickness of metal, and with raised projecting or flanged edges *a'*, forming a wide shallow groove around the bracelet. Upon the surface of the band A, between the raised edges *a'*, is formed, or to it is attached, the raised ornamental work, which may be more or less elaborate, and of any desired design which the taste or skill of the artist may suggest. With this construction the raised edges *a'* will protect the ornaments and prevent them from being knocked, rubbed, or pulled off while the bracelets are being worn, and at the same time will aid in forming a better background for the ornaments and increase the beauty and the artistic effect of the design.

In defining my invention more clearly I would state that I am aware that it is not new to construct a single-band bracelet with rigid marginal flanges without the raised ornamental work, and that a single-band bracelet has also been provided with raised ornamental work without the raised marginal flanges.

My construction is designed for fine goods, and it is characterized by the following distinctive advantages: The flanges are rigid and durable, and as the raised ornamentation does not rise above the said flanges, the latter protect said ornamentation and render practical the employment of the same by preventing it from being worn or knocked off. The raised or Etruscan work, which I permanently solder to the surface of the band, is very delicate, and its beauty is easily marred by abrasion. The raised rigid flanges, the peculiar kind of ornamentation, and the single band then have in my improvement a special coaction, in that the raised flange permits the delicate Etruscan work to be successfully employed without being damaged or worn by abrasion with plain surfaces, while the raised nature of the ornamentation gives to the single and less expensive band the appearance of massiveness and richness which a single band would not otherwise have.

Having thus described my invention, what I claim as new is—

A bracelet constructed of a single band having ornamentation in relief permanently fixed upon its outer surface, and rigid marginal flanges or projections rising to the level of or above the raised ornamentation, so as to protect the latter against wear and assist in forming a background for the same, as described.

CHARLES HEIN.

Witnesses:

JAMES T. GRAHAM,

C. SEDGWICK.